Aug. 2, 1932.  M. C. CARBONARO  1,869,953
MEASURING AND FEEDING DEVICE FOR LIQUIDS
Filed April 20, 1929   2 Sheets-Sheet 1
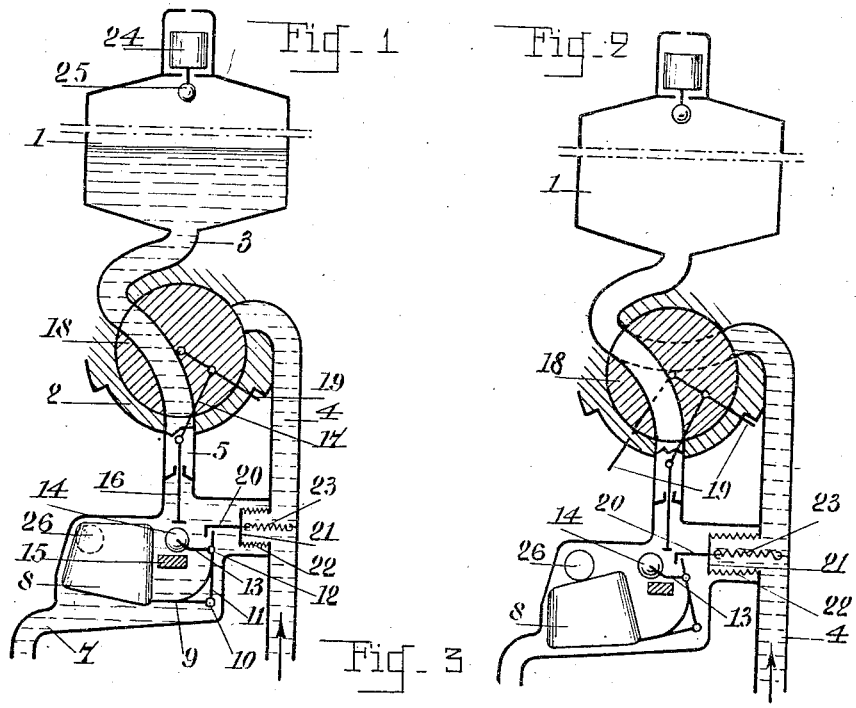
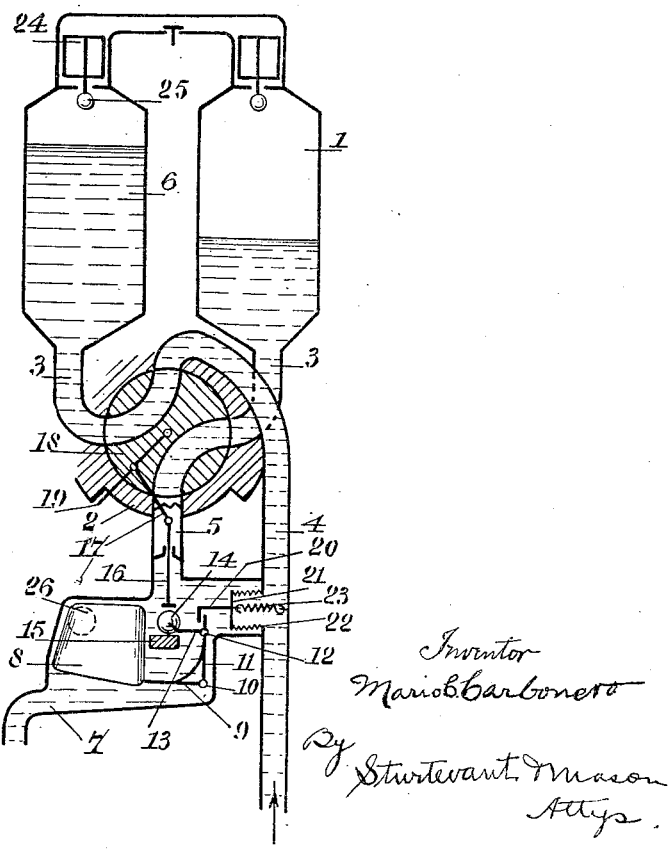
Inventor
Mario C. Carbonaro
By Sturtevant & Mason
Attys.

Aug. 2, 1932.  M. C. CARBONARO  1,869,953
MEASURING AND FEEDING DEVICE FOR LIQUIDS
Filed April 20, 1929   2 Sheets-Sheet 2
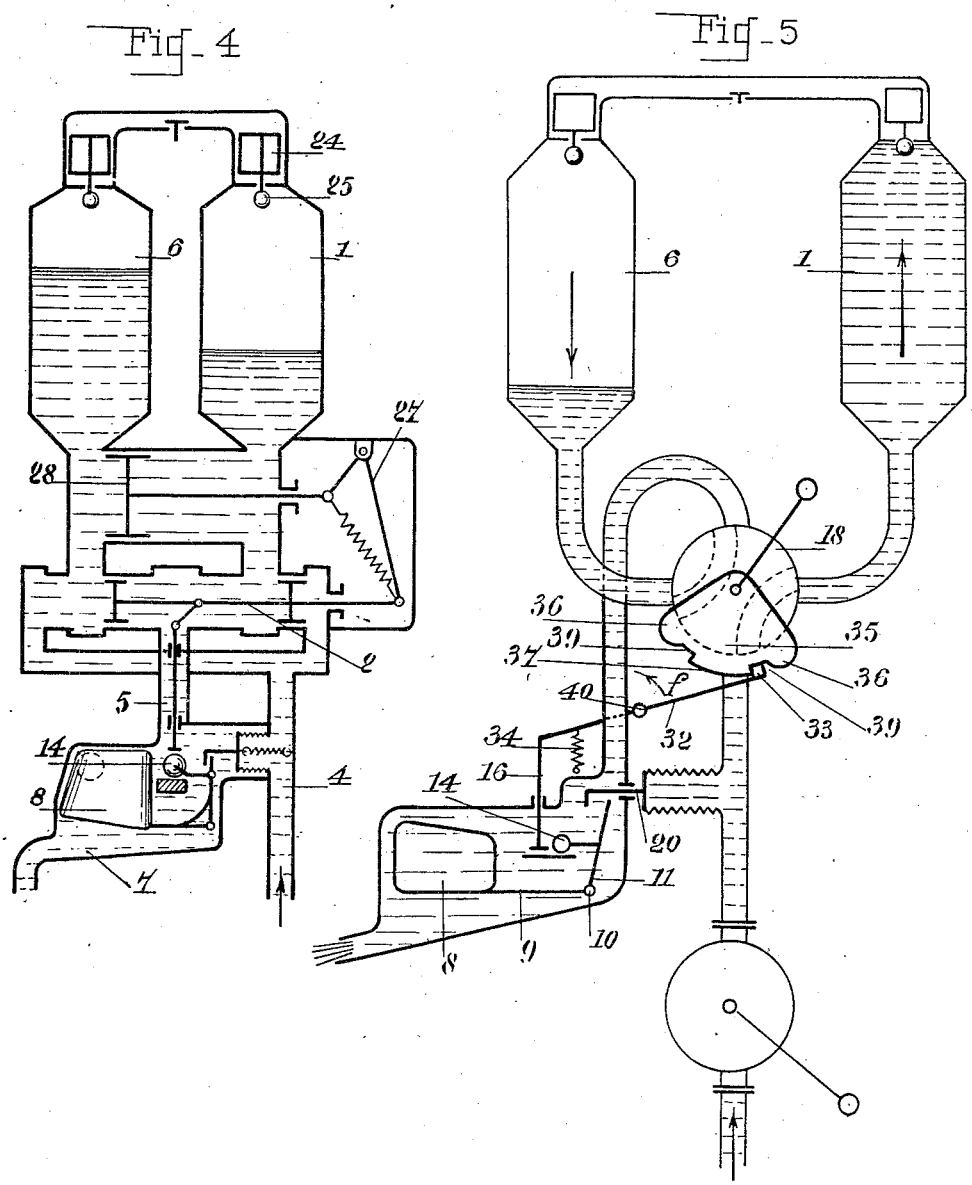

Patented Aug. 2, 1932

1,869,953

UNITED STATES PATENT OFFICE

MARIO CLEMENT CARBONARO, OF PARIS, FRANCE, ASSIGNOR TO SOCIÉTÉ ANONYME POUR TOUS APPAREILLAGES MÉCANIQUES, OF LEVALLOIS-PERRET, SEINE, FRANCE

MEASURING AND FEEDING DEVICE FOR LIQUIDS

Application filed April 20, 1929, Serial No. 356,670, and in France April 27, 1928.

The present invention relates to measuring and feeding devices for liquids, in which the apparatus is filled and emptied by means of a valve which is operated automatically or under hand control.

The invention has for its object to prevent all interference with the filling and emptying operations by an improper handling of the reversing mechanism.

For this purpose, the apparatus comprises a float which is mounted in the emptying conduit and whose movements are controlled by the displacement of an element which is affected by the pressure of the liquid and said float displaces a suitable stop, such as a ball, which is adapted to hold fast a device under the control of the reversing element.

The accompanying drawings show by way of example various embodiments of the invention.

Figures 1 and 2 show two views of an apparatus comprising a single measuring vessel.

Figure 3 shows a like apparatus comprising two such vessels, subject to hand control.

Figure 4 shows a similar apparatus adapted for automatic action.

Figure 5 shows a modified apparatus comprising two measuring vessels.

In Figures 1 and 2, the apparatus comprises a vessel 1 for measuring out the liquid (measuring vessel) which is provided with a cock 2 adapted to connect the said measuring vessel, through the medium of the conduit 3, alternatively with the supply pipe 4 and the discharge pipe 5.

The supply pipe can be connected to a feeding pump, not shown. On the discharge pipe 5 is mounted a chamber 7 containing a float 8 disposed on one branch 9 of a bell crank lever pivoted on an axle 10; the other branch 11 of the said lever carries an axle 12 on which is pivoted a lever 13 carrying a ball 14 which may rest upon a support or seat 15. The said ball, in the lower position of the said float (Figure 2) permits the displacement of a set of rods 16—17, pivoted on the plug or cylinder 18 of the said cock or upon its controlling handle 19. The motion of the bell crank lever 9 is controlled by a hook 20 forming an auxiliary catch coacting with the end of the arm 11 of said lever 9. The said hook 20 is secured to a member 21 mounted on a deformable membrane 22 whose internal face is in free communication with the said supply pipe 4 connected to the pump and is thus subjected to the pressure of the liquid in said pipe. A spring 23 holds the member 21 and the membrane 22 in the normal position, as shown in Figure 1. On the measuring vessel 1 is mounted, as usual, a float 24 carrying a valve 25 adapted to close the upper orifice of the vessel. The motion of the said float can be observed through a sight hole 8.

The operation is as follows.

In the position shown in Figure 1, the said vessel 1 is being emptied. The float 8 is in the raised position, and there is no excess of pressure in the pipe 4, so that the ball 14 now rests upon its seat 15, and the cock plug 18 cannot be turned since the rod device 16—17 is held in its upper position by the ball 14.

In the position shown in Figure 2, the vessel 1 is now empty, and the float 8 has descended. If the pump is now operated, this produces a pressure in the pipe 4 which acts upon the member 21, thus stretching the membrane 22 against the spring 23; the hook 20 moves to the left, and since the lever 9 is released from the hook, it pivots on its axis 10 by the weight of the float, and the ball is moved to the left, as shown in Figure 7. The operator can now turn the cock plug 18, since the rod device 16—17 is no longer held by the said ball.

A sighting device 26 is used to observe the motion of the float 8, and to determine the exact time of the reversal.

The apparatus shown in Figure 3 differs from the preceding only by the fact that it comprises two measuring vessels 1 and 6 whose pipes 3 are connected to the supply pipe 4 or to the discharge pipe 5 by a four way cock 2.

The supply pipe 4 is always connected to one of the vessels 1 or 6, and the discharge pipe with the other vessel. The excess of pressure in the pipe 4 can only be produced when one or the other of the vessels is entirely filled. The float 8 can only descend when the emptying of the vessel connected to the pipe 5 is entirely finished. In this manner, the cock 2 can only be operated when one vessel is entirely filled and the other empty.

The apparatus shown in Figure 4 differs from the one shown in Figure 3 only by the substitution of slide valve 2 for the cock 2, said valve being controlled by a quick-reversal mechanism 27 controlled by a piston 28 subjected to the difference of pressures in the two vessels. The pressure which is produced when one vessel is entirely filled will not only actuate the piston 28 in the known manner, but will also move the ball 14, as above specified, if the float 8 is now in the lower position, that is, if the emptying of the other vessel is complete. The slide valve 2 can now be displaced.

Figure 5 shows a modification in which an additional fastening device is disposed between the ball 14 and the said reversing element.

A cam 35, mounted on the reversing element 18, comprises two projections 36—37 separated by two notches 39. A lever 32, pivoting on an axle 40, is urged in rotation according to the arrow $f$ by a spring 34. The stud 33, mounted on the said lever, is thus urged towards the cam 35. Upon the other arm of the lever 32 is mounted a rod 16 which is maintained in the upper position when the ball 14 is below it. To bring the said ball into this position, it is necessary: first, that the hook 20 be in the extreme left hand position, as shown in the drawings, in which position the vessel 1 which is being filled is now entirely full of liquid; and secondly, that the float 8 be in the lower position (Figure 5), in which the vessel which is under discharge is now entirely empty.

In these conditions, the set of levers 9—11 will turn on the axle 10, and hence the ball is moved to the left of the position indicated, and it comes below the rod 16.

If the said rod 16 is in the lower positions as shown that is, if the reversing element 18 is held fast, it is necessary to bring the valve 18 to the rear so as to slide the stud 33 upon the inclined part 36 of the cam; thus pivoting the lever 32 on its axle 40 against the spring 34, thereby raising the rod 16, so that the ball 14 can now come below the rod 16 and hold it in the raised position. The lever 32 and the stud 33 are now removed from the cam 35 and are made to disappear. The stud can no longer enter the notch 39, so that the valve 18 can now be operated.

As soon as the emptying of the filled vessel commences, the float 8 is raised, and the ball 14 is brought back to the indicated position. When the valve 18 is to be operated, the stud 33 drops into the first notch 39, which it meets.

In these conditions, no reversal can be effected if the filling of one vessel and the emptying of the other have not been entirely completed. The maximum effort upon the ball 14 is limited to the effort of the rod 16 upon the ball by the spring 34, since the efforts due to the operating of the valve 18 are brought upon the axle 40 of the lever 32.

Having now particularly described and ascertained the nature of my invention and in what manner the same is to be performed, I declare that what I claim is:

1. In apparatus as described, the combination of a liquid measuring assembly, means supplying liquid under pressure to said measuring assembly, a valve means controlling the flow a liquid to and discharge from said measuring assembly, a lever having an arm coacting with said valve and a second arm associated with spring means, a member connected to the second arm, locking means for the member, means controlled by the discharging liquid and the liquid supplying means for actuating the locking means.

2. In apparatus as described, the combination of a liquid measuring assembly, means supplying liquid under pressure to said measuring assembly, a valve means controlling the flow of liquid to and discharge from said measuring assembly, a cam integral with the valve means, a lever having an arm coacting with said valve and a second arm associated with spring means, a member connected to the second arm, locking means for the member, means controlled by the discharging liquid and the liquid supplying means for actuating the locking means.

3. In apparatus as described, the combination of a liquid measuring assembly, means supplying liquid under pressure to said measuring assembly, a valve means controlling the flow of liquid to and discharge from said measuring assembly, a cam integral with the valve means, having a plurality of notches and projections, a lever arm having a clutch coacting with the notches and projections of the cam, a second lever-arm rigidly connected to the first named lever-arm, spring means tending to engage said clutch with the cam, a member connected to the second lever arm, locking means for the member, means controlled by the discharging liquid and the liquid supplying means for actuating the locking means.

4. In apparatus as described, the combination of a liquid measuring assembly, means supplying liquid under pressure to said measuring assembly, a valve means controlling the flow of liquid to and discharge from said measuring assembly, a cam integral with the valve means, having a plurality of notches and projections, a lever-arm having a clutch coacting with the notches and projections of the cam, a second lever-arm rigidly connected to the first named lever arm, spring means tending to engage said clutch with the cam, a member connected to the second lever-arm, locking means for the member, a float means operated by the discharging liquid for actuating the locking means, said float being controlled by a diaphragm operated by the liquid pressure of the liquid supplying means.

5. In apparatus as described, the combination of a liquid measuring assembly, means supplying liquid under pressure to said measuring assembly, a valve means controlling the flow of liquid to and discharge from said measuring assembly, a cam integral with the valve means, having a plurality of notches and projections, a lever-arm having a clutch coacting with the notches and projections of the cam, a second lever-arm rigidly connected to the first named lever arm, spring means tending to engage said clutch with the cam, a member connected to the second lever-arm, locking means for the member, a float operated by the discharging liquid, a connecting piece between the float and the locking means, a diaphragm operated by the liquid pressure of the liquid supplying means, a member connected to the diaphragm for controlling the movement of the connecting piece.

6. An apparatus as described having a pair of vessels, feed and discharge conduits, a pump connected to said feed conduit, a valve for alternate filling and discharge of the vessels, a cam integral with the valve having notches and projections, a lever-arm having a clutch coacting with the notches and projections of the cam, a second lever-arm rigidly connected to the first lever-arm, spring means associated with the second lever-arm, a member connected to the second lever-arm, a ball for locking the member, a float in the discharge conduit, a connecting piece between the float and the locking-ball, a diaphragm operated by the pressure developed by the pump, a member connected to the diaphragm for controlling the movement of said connecting piece.

7. Liquid meter comprising at least one measuring vessel, a supply conduit for liquid under pressure, a discharge conduit, a reversing element for alternatively placing the vessel in communication with the said supply and discharge conduits, a latch for the reversing element, an element responsive to the discharge of the liquid and located in the discharge conduit for controlling the said latch, an element responsive to the liquid pressure in the liquid supply conduit, and means for controlling the movements of the discharge-responsive element controlled by the said pressure responsive element.

8. Liquid meter comprising at least one measuring vessel, a supply conduit for the liquid under pressure, a discharge conduit, a reversing element for alternatively placing the vessel in communication with the said supply and discharge conduits, a bolt for the reversing element, a float located in the discharge conduit for controlling the said bolt, an element responsive to the liquid pressure in the liquid supply conduit, and means for controlling the movements of the float controlled by the said pressure responsive element.

9. In a meter according to claim 8, in which the means for controlling the movements of the float comprises a hook co-acting with an integral part of the float.

10. In a meter according to claim 8, the employment of a lever and rod system positively controlled by the reversing element.

11. In a meter according to claim 8, the employment of a lever and rod system positively controlled by the reversing element, and a ball for controlling the said float and latching the lever and rod system.

12. In a meter according to claim 8, elastic means connected to the pressure responsive element and whose action is added to the pressure of the liquid.

13. Liquid meter comprising at least one measuring vessel, a supply conduit for the liquid under pressure, a discharge conduit, a reversing element for alternatively placing the reservoir in communication with the said supply and discharge conduits, an element responsive to the liquid pressure in the liquid supply conduit, a float located in the discharge conduit and means for controlling the movements of the float and controlled by the said pressure responsive element, a latch controlled by the said float, a cam integral with the said reversing element and comprising a plurality of projections and notches, a shaft, a lever pivoting on the said shaft, a spur mounted on the said lever and cooperating with the said cam, elastic means for pressing the said spur against the said cam, and a rod pivoted on the end of the said lever opposite the said spur and cooperating with the said bolt.

14. In apparatus as described, the combination of a liquid measuring assembly, means for supplying liquid under pressure to said measuring assembly, valve means controlling the flow of liquid to and discharge from said measuring assembly, a device positively connected to the valve means to prevent operation thereof, locking means for said device, and means controlled by the discharging liquid and the said liquid supplying means for actuating said locking means.

15. Liquid meter comprising at least one measuring vessel, a supply conduit for the liquid under pressure, a discharge conduit, a reversing element for alternatively placing the vessel in communication with the said supply and discharge conduits, a bolt for the reversing element, a float located in the discharge conduit for controlling the said bolt, an element responsive to the liquid pressure in the liquid supply conduit, a member integral with said float, and a member controlled by the movement of said pressure responsive element, and cooperating with said float member for controlling the movement of said float.

MARIO CARBONARO.